United States Patent
Laurichesse

(10) Patent No.: US 6,882,908 B2
(45) Date of Patent: Apr. 19, 2005

(54) METHOD FOR CALCULATING INSTANTANEOUS CHARACTERISTICS OF A SATELLITE IN ORBIT, EQUIPPED WITH A GNSS RECEIVER

(75) Inventor: Denis Laurichesse, Tournefeuille (FR)

(73) Assignee: Centre National d'Etudes Spatiales, Paris (FR)

(*) Notice: Subject to any disclaimer, the term of this patent is extended or adjusted under 35 U.S.C. 154(b) by 33 days.

(21) Appl. No.: 10/363,696
(22) PCT Filed: Sep. 14, 2001
(86) PCT No.: PCT/FR01/02863
§ 371 (c)(1), (2), (4) Date: Mar. 12, 2003
(87) PCT Pub. No.: WO02/23214
PCT Pub. Date: Mar. 21, 2002

(65) Prior Publication Data
US 2004/0064222 A1 Apr. 1, 2004

(30) Foreign Application Priority Data
Sep. 15, 2000 (FR) .............................. 00 11787

(51) Int. Cl.$^7$ .............................................. H04B 7/185
(52) U.S. Cl. ..................... 701/13; 701/210; 701/214; 701/215; 342/358; 342/357.12; 342/357.15
(58) Field of Search ......................... 701/13, 210, 213, 701/214, 215; 342/357.06, 357.12, 357.15, 357.16, 358

(56) References Cited

U.S. PATENT DOCUMENTS

| | | | | |
|---|---|---|---|---|
| 5,740,048 A | * | 4/1998 | Abel et al. ................... | 701/200 |
| 5,995,040 A | * | 11/1999 | Issler et al. .................. | 342/352 |
| 6,014,404 A | * | 1/2000 | Issler ........................... | 375/130 |
| 6,016,117 A | * | 1/2000 | Nelson, Jr. ................... | 342/352 |
| 6,072,428 A | * | 6/2000 | Schipper et al. ......... | 342/357.01 |
| 6,166,684 A | * | 12/2000 | Yoshikawa et al. .... | 342/357.08 |
| 6,169,958 B1 | * | 1/2001 | Nagasamy et al. ......... | 701/213 |
| 6,181,275 B1 | * | 1/2001 | Chenebault et al. ... | 342/357.05 |
| 6,424,913 B1 | * | 7/2002 | Fichter et al. .............. | 701/213 |

FOREIGN PATENT DOCUMENTS

| | | |
|---|---|---|
| EP | 0 961 132 | 12/1999 |
| WO | 99 50618 | 10/1999 |

OTHER PUBLICATIONS

C. Mehlen et al.: "Improving GPS navigation with orbital filter" Proceedings 4$^{th}$ ESA International Conference on Spacecraft Guidance, Navigation and Control Systems and Tutorial on Modern and Robust Control: Theory, Tools and Applications, pp. 123–130, 2000.

J. Potti et al.: "Applicability of GPS–based orbit determination systems to a wide range of HEO missions" International Technical Meeting of the Satellite Division of the Institute of Navigation, no. Part 01 of 02, pp. 589–598, Sep. 12, 1995.

M.C. Moreau et al.: "GPS receiver architecture and expected performance for autonomous navigation in high Earth orbits" Navigation, Journal of the Institute of Navigation, vol. 47, no. 3, pp. 191–204.

* cited by examiner

Primary Examiner—Thomas G. Black
Assistant Examiner—Eric M. Gibson
(74) Attorney, Agent, or Firm—Oblon, Spivak, McClelland, Maier & Neustadt, P.C.

(57) ABSTRACT

A method for calculating instantaneous characteristics of a satellite in orbit equipped with a GNSS receiver, capable of performing measurements of pseudo-distance, when fewer than four transmitters are simultaneously in visibility. This method pre-processes quantities measured by the receiver to deliver measurements of pseudo-distance, pseudo-speed and instantaneous pseudo-accelerations, mathematically processes the measured quantities, enhanced by knowledge of complementary data concerning the orbit of the satellite and the receiver, delivering plural solutions, and physically filters the solutions to deliver position and speed of the satellite and clock bias and drift of the receiver.

11 Claims, 3 Drawing Sheets

METHOD FOR CALCULATING INSTANTANEOUS CHARACTERISTICS OF A SATELLITE IN ORBIT, EQUIPPED WITH A GNSS RECEIVER

TECHNICAL FIELD

The present invention relates to a method for calculating the instantaneous characteristics (position, speed, clock bias and drift) of a satellite in orbit equipped with a GNSS receiver, capable of performing measurements of pseudo-distance, when fewer than four transmitters are simultaneously in visibility of the receiver satellite.

PRIOR ART

The method according to the invention introduces a receiver, for example of type GNNS, capable of producing measurements of pseudo-distance and optionally of pseudo-speed, as well as a module for instantaneously calculating geometric points.

If:

$\vec{P}_e, \vec{V}_e, \vec{\gamma}_e$ the position, speed and acceleration of a transmitter satellite are placed at the emission date of the signal, $\vec{P}, \vec{V}, \vec{\gamma}$ the position, speed and acceleration of the receiver satellite, are placed at the emission date of the signal, the following definitions result:

Pseudo-Distance

The measurement of pseudo-distance is the distance of geometric propagation between a transmitter satellite and the receiver satellite added to the clock bias of the receiver satellite.

The distance of geometric propagation between the transmitter satellite and the receiver satellite is described:

$$p = \|\vec{r}\|, \text{ with } \vec{r} = \vec{P} - \vec{P}_e$$

The measurement of instantaneous pseudo-distance Pd is described directly from the distance of geometric propagation:

$$Pd = p + b = \|\vec{r}\| + b \quad (1)$$

b being the clock bias of the receiver satellite.

This equation (1) is the mathematical form of the measurement of pseudo-distance performed by a GNSS receiver.

Instantaneous Pseudo-speed

The measurement of pseudo-speed is the radial speed between a transmitter satellite and the receiver satellite added to the clock drift of the receiver satellite.

The measurement of instantaneous pseudo-speed Pv is described by deriving once the distance of geometric propagation.

This is stated $\rho^2 = \vec{r} \cdot \vec{r}$ and thus $pp' = \vec{r} \cdot \vec{r}'$ with $\vec{r}' = \vec{V} - \vec{V}_e$.

Hence $$\rho' = \vec{u} \cdot \vec{r}' \text{ with } \vec{u} = \frac{\vec{P} - \vec{P}_e}{\|\vec{P} - \vec{P}_e\|}$$

and $$Pv = \rho' + \frac{\Delta f}{f} \quad (2)$$

$\frac{\Delta f}{f}$ being the clock frequency bias of the receiver satellite.

The measurement of instantaneous pseudo-speed can be directly enhanced from the phase measurement of a GNSS receiver, if available, or then by differentiation calculation on the measurements of pseudo-distances.

These measurements of pseudo-distance and optionally pseudo-speed are the raw measurements performed by the receivers. The definition of these measurements is given in the document referenced by [1] at the end of this description.

Instantaneous Pseudo-acceleration

The measurement of instantaneous pseudo-acceleration corresponds to the radial acceleration between a transmitter satellite and the receiver satellite corrected by the clock drift of the receiver satellite.

The measurement of instantaneous pseudo-acceleration Pa is described by deriving twice the distance of geometric propagation.

There is:

$$\rho\rho'' + \rho'^2 = \vec{r} \cdot \vec{r}'' + \vec{r}'^2$$

with $\vec{r}'' = \vec{\gamma} - \vec{\gamma}_e$ and with the Keplerian hypothesis:

$$\vec{r}'' = -\mu\left(\frac{\vec{P}}{\|\vec{P}\|^3} - \frac{\vec{P}_e}{\|\vec{P}_e\|^3}\right)$$

and $$Pa = \rho'' = \frac{\vec{r} \cdot \vec{r}'' + \vec{r}'^2 - \rho'^{2}}{\rho} = \frac{1}{\|\vec{r}\|}[\vec{r} \cdot \vec{r}'' + \vec{r}'^2 - (\vec{u} \cdot \vec{r}')^2] \quad (3)$$

The measurement of instantaneous pseudo-acceleration is enhanced by a differentiation calculation on the instantaneous measurements of pseudo-speed.

TTFF ("Time to First Fix")

The TTFF duration, for a receiver, is the duration between the initialisation of the receiver and the moment when it is capable of producing a geometric point. Generally, this duration is equal to the time of acquisition of four simultaneous measurements originating from four different satellites as described in the document under [2]. Measurement is understood to mean actual radio-electric measurement, but also all the additional data allowing it to be processed, such as the positions and speeds of the transmitter satellites, transmitted in the signal in the form of almanacs. In the GPS system ("Global Positioning System"), this time depends on the time of acquisition and decoding of the almanacs (if not already available), and the time of capture of the radio-electric signal on four satellites simultaneously. The acquisition and decoding of the almanacs, which can be done on a single satellite, takes a minimum of 12.5 minutes. The time of capture of the radio-electric signal corresponds to the time necessary for the algorithms for processing the signals of the receiver to be locked onto the frequency of the transmitter and to be capable of enhancing the measurements. This time depends on numerous factors such as the placement of antennae or the characteristics of the receiver (sensitivity, number of channels). It can range from a few minutes to a few hours.

The classic calculation of a geometric GNNS point, constituted by the position and the clock of the receiver, introduces four simultaneous measurements of pseudo-distance and a calculation generally based on filtering fewer squares, as described in reference document [3]. When the measurements of pseudo-speeds are available (or calculated from pseudo-distances), it is possible to know the speed of the mobile and the clock drift. This instantaneous point calculation is different to filtering by orbital navigator, where the measurements are processed over a longer time interval.

In an orbital application, that is, when the receiver is embarked on a satellite, it performs the same operation as on the ground to calculate its position: example of four simultaneous measurements and calculation of a geometric point. The precision of position is as good as for a receiver on the ground. However, the TTFF duration of four simultaneous satellites can be relatively slow, due to the significant Doppler dynamic of variation of the input signal (relative to a ground receiver). The search range can vary from + or −40 Khz in the case of a satellite in low orbit, and the search time of the signals can be so long that the satellite is lost before being locked onto. Similarly, in certain particular cases the reception antenna cannot be placed on the good surface, since the law of attitude of the satellite is not very favourable to good reception, or the receiver itself is not very sensitive. Consequently, it is never possible to have four satellites in simultaneous visibility.

The object of the invention is to eliminate these disadvantages by proposing a method which, due to knowledge of certain elements of the orbit of the receiver satellite, enables a geometric point with fewer than four satellites in visibility to be calculated.

The desired object is the calculation of a point from two satellites in visibility in low orbit or in geostationary transfer orbit and of a satellite in visibility in geostationary orbit.

DESCRIPTION OF THE INVENTION

The present invention proposes a method for calculating instantaneous characteristics of a satellite in orbit, equipped with a GNSS receiver, capable of performing measurements of pseudo-distance when fewer than four transmitters are in simultaneous visibility, characterised in that it comprises the following stages:
- a first stage of pre-processing of quantities measured by the receiver to deliver measurements of pseudo-distance, pseudo-speed and instantaneous pseudo-accelerations;
- a second stage of mathematically processing these measurements, enhanced by the knowledge of complementary data concerning the orbit of the receiver satellite and the receiver, delivering several solutions,
- a third stage of physically filtering these solutions delivering the position and the speed of the receiver satellite as well as the clock bias and drift of the receiver.

In an embodiment during the first stage, measurement of instantaneous pseudo-speed is calculated by differentiation of two measurements of pseudo-distances close in time:

$$Pv = \frac{Pd2 - Pd1}{\Delta T},$$

$\Delta T$ being the time spread between the two measurements Pd1 and Pd2.

In an embodiment during the first stage, measurement of instantaneous pseudo-acceleration is calculated by differentiation of two instantaneous measurements of pseudo-speeds close in time:

$$Pa = \frac{Pv2 - Pv1}{\Delta T},$$

$\Delta T$ being the time spread between the two measurements Pv1 and Pv2.

Throughout the second stage, the solutions being sought are the following:

position of the receiver satellite $\vec{P}$ speed of the receiver satellite $\vec{V}$ clock bias of the receiver b clock frequency shift of the receiver $$\frac{\Delta f}{f}.$$

During the third stage, for a receiver satellite in low orbit, the meniscal axis a of the desired solution is considered as restricted: 6400 Km<a<8400 Km, the absolute value of the clock frequency shift of the receiver as restricted:

in low orbit with a low-quality oscillator there is:

$$\left|\frac{\Delta f}{f}\right| < 300 \ \frac{m}{s}$$

and in geostationary orbit, with a good-quality oscillator, there is:

$$\left|\frac{\Delta f}{f}\right| < 10 \ \frac{m}{s}$$

During the third stage a reference inclination of the receiver satellite may be considered. The inclination of the satellite closest to this reference inclination is then selected.

During this stage, the satellite must be in visibility of each transmitter.

The method according to the invention enables the instantaneous characteristics of the receiver satellite to be obtained more rapidly than when using classic techniques, and thus enables the "time to first fix" duration to be improved. This geometric point obtained with fewer than four satellites in simultaneous visibility can be utilised to limit the Doppler search range and thus to acquire the different simultaneous satellites, so as to then be able to produce a classic point, for example. When four transmitter satellites at least are in visibility of the receiver satellite, the method according to the invention is compatible with classic point calculation (identical precision).

BRIEF DESCRIPTION OF THE DIAGRAMS

DETAILED DESCRIPTION OF EMBODIMENTS

The invention relates to a method for calculating the instantaneous geometric point of a receiver satellite with fewer than four transmitter satellites in visibility. This method further allows the speed and clock shift of the receiver to be known.

The method according to the invention in effect allows complementary data on the orbit of the satellite to be utilised to compensate the lack of measurements when fewer than four transmitter satellites are presents simultaneously.

In orbit, complementary data is available to be exploited, such as movement of the orbit of the receiver satellite, inclination of the orbit in the case of a satellite in low orbit, or altitude in the case of a geostationary satellite, as well as data peculiar to the receiver, such as geometry of the antenna, reception sensitivities (link balance) and clock characteristics. This information can be utilised to calculate a geometric point with fewer than four transmitter satellites in simultaneous visibility. This point, even less precise, may be utilised to limit the Doppler search range and thus acquire the transmitter satellites simultaneously to then be able to make a classic point, for example.

Figure 1:
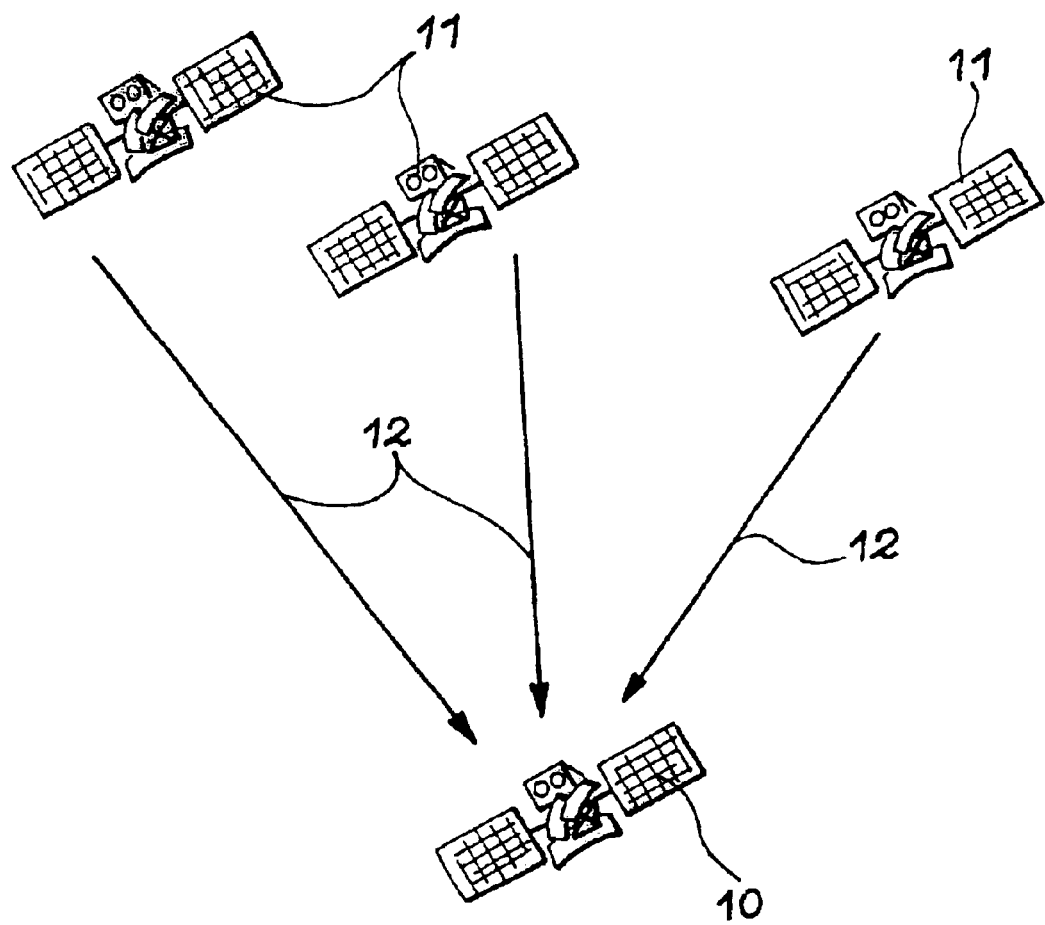
FIG. 1 illustrates a GNSS reception system.
Figure 1:
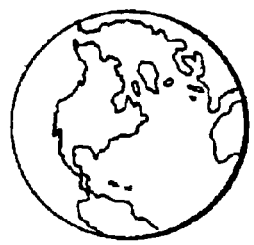

FIG. 1 thus illustrates use of the method according to the invention where a receiver of type GNSS embarks on the satellite, with a receiver satellite 10, and three transmitter satellites 11 in visibility thereof, and the transmitted radio-electric signals 12. The receiver must be of type GNSS, be on board a satellite in orbit and also must be capable of receiving signals such as to perform at least measurements of pseudo-distance. Such signals can be transmitted by other satellites in orbit or from terrestrial transmitters. The receivers can, for example, be of the following types: GPS, GLONASS, GNSS1, GNSS2, GALILEO, broad transponder spectrum or narrow band, DORIS broad spectrum. The constellations GPS and GLONAS1 are respectively described in the documents [4] and [5]. GNNS1 designates the geostationary equipment in complement to GPS and GLONASS utilising the navigation packages of the INMARSAT 3 satellites. GNNS2 desginates the future civil navigation system via satellite. GALILEO desginates the future European navigation system via satellite. DORIS broad spectrum desginates a future radionavigation system making use of signals put out by terrestrial beacons and received by satellites.

Figure 2:
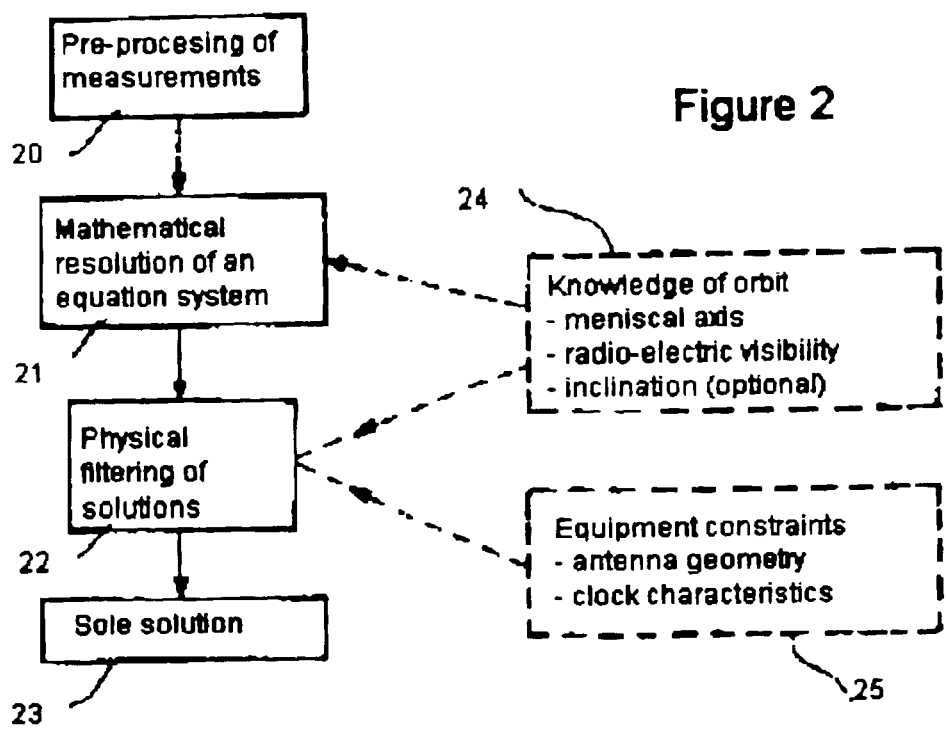
FIG. 2 illustrates the different stages of the method according to the invention.
Figure 3:
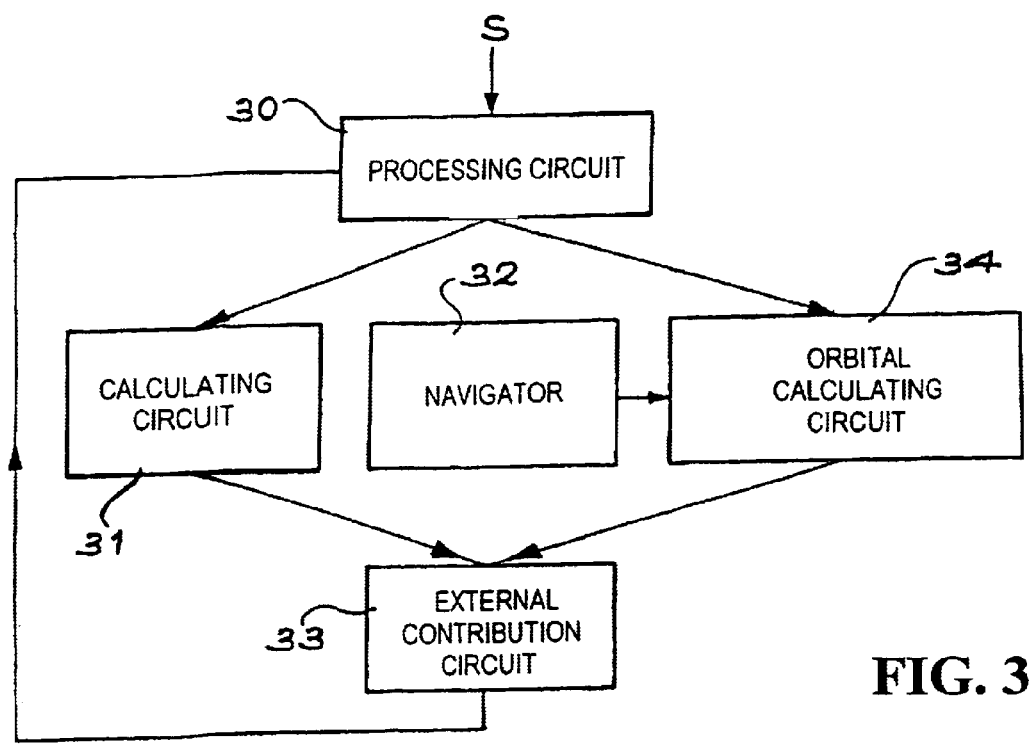
FIG. 3 illustrates a device enabling the inventive method to be implemented.

As illustrated in FIG. 2, the method according to the invention comprises the following stages:
- a stage 20 of pre-processing measurements available on the receiver satellite 10. The input data are measurements of raw pseudo-distance and optionally raw instantaneous pseudo-speed. The output data are the measurements of pseudo-distance Pd, of instantaneous pseudo-speed Pv, and of instantaneous pseudo-acceleration Pa,
- a stage 21 of mathematical resolution of a system of equations delivering N mathematical solutions. The input data are the measurements of pseudo-distance, pseudo-speed and instantaneous pseudo-acceleration, as well as the knowledge of the orbit of the receiver. The output data correspond to a finished set of solutions of said system of equations,
- a stage 22 of physically filtering these solutions. The input data are the solutions of the mathematical system, the knowledge of the orbit of the receiver as well as data on the reception equipment. The output data correspond to a physical solution to a unique problem 23 (position, time, speed, clock drift).

The blocks 24 and 25, illustrated in FIG. 2, represent the data utilised throughout stages 21 and 22 of mathematical resolution of a system of equations and physical filtering of the solutions of the method according to the invention.

The block 24 relates to the knowledge of the orbit of the receiver satellite 10, due to:

its meniscal axis, its radio-electric visibilities, its inclination (optional).

The block 25 relates to the reception equipment limits of this satellite 10, namely:

antenna geometry, clock characteristics.

Each of these stages 20, 21 and 22 will be analysed hereinbelow.

Pre-processing Stage (20)

The pre-processing consists, from quantities measured by the GNSS receiver on board the satellite 10, of calculating the following quantities:

pseudo-distance Pd, instantaneous pseudo-acceleration Pv, instantaneous pseudo-acceleration Pa.

The measurement of pseudo-distance is always measured by the receiver.

The measurement of instantaneous pseudo-speed is available either in the receiver (calculated for example from phase measurements), or it is not available and is then calculated by differentiation of two measurements of pseudo-distances close in time:

$$Pv = \frac{Pd2 - Pd1}{\Delta T},$$

$\Delta T$ being the time spread between the two measurements Pd1 and Pd2.

The measurement of instantaneous pseudo-acceleration is calculated by differentiation of two measurements of pseudo-speeds instantaneous close in time:

$$Pa = \frac{Pv2 - Pv1}{\Delta T},$$

$\Delta T$ being the time spread between the two measurements Pv1 and Pv2.

Mathematical Problem Resolution Stage (21)

The unknown quantities of the problem, that is, the values to be resolved, are as many as eight. This concerns:

the position of the receiver satellite $\vec{P}$ the speed of the receiver satellite $\vec{V}$ the clock bias of the receiver b the clock frequency shift of the receiver $$\frac{\Delta f}{f}$$

Resolution of the mathematical problem introduces a set of eight equations. This set is made up of the available measurements and the supplementary knowledge of the orbit.

1) Equations in the Case of a Receiver Satellite in Low Circular Orbit with Two Transmitter Satellites in Visibility In this hypothesis the following equations of circularity are verified:

$$\vec{P} \cdot \vec{V} = 0 \qquad (4)$$

and $$\|\vec{V}\|^2 - \frac{\mu}{\|\vec{P}\|} = 0 \quad (5)$$

In the presence of two transmitter satellites in visibility, the following quantities are available: Pd1, Pd2, Pv1, Pv2, Pa1, Pa2 and thus equations of corresponding measurements (1), (2) and (3).

Therefore eight equations in all for eight unknown quantities are available. The system thus has a finite number of solutions, which are resolved by a method of fewer squares.

2) Equations in the Case of a Receiver Satellite in Low Orbit with Three Transmitter Satellites in Visibility In the presence of three transmitter satellites in visibility, the following quantities are available: Pd1, Pd2, Pd3 Pv1, Pv2, Pv3, Pa1, Pa2, Pa3 and thus corresponding measurement equations (1), (2) and (3).

Therefore nine equations in all are available for eight unknown quantities. The system thus has a finite number of solutions, which are resolved by a method of fewer squares.

In this case the orbit has no need of being circular.

3) Equations in the Case of a Receiver Satellite in Geostationary Orbit with a Transmitter Satellite in Visibility In this hypothesis, the following equations of circularity are verified:

$$\vec{P} \cdot \vec{V} = 0 \quad (4)$$

and $$\|\vec{V}\|^2 - \frac{\mu}{\|\vec{P}\|} = 0 \quad (5)$$

There is an extra constraint on the meniscal axis:

$$\|\vec{P}\| = 42164 \text{ km} \quad (6)$$

then two constraints for the equatorial orbit:

$$\vec{P}_z = 0 \quad (7)$$

$$\text{and } \vec{V}_z = 0 \quad (8)$$

In the presence of a transmitter satellite in visibility, the following quantities are available: Pd1, Pv1, Pa1 and thus the corresponding equations of measurement (1), (2) and (3).

Therefore eight equations in all are available for eight unknown quantities. The system thus has a finite number of solutions, which are resolved by a method of fewer squares.

Physical Filtering of Solutions Stage (22)

The physical filtering of the solutions obtained in the preceding stage is performed due to extra considerations on the physics of the problem. These considerations are as follows:

1. For the low orbits the meniscal axis of the desired solution is typically limited 6400 Km<a<8400 Km.

2. The satellite must be in radio-electric visibility of each transmitter (that is, for each transmitter satellite the transmitter/receiver section must not pass over the earth, and this propagation section of the signal must be compatible with the diagrams of sending and receiving antenna).

3. The absolute value of the clock frequency shift of the receiver must be limited in terms of the type of oscillator being used.

typically in low orbit (utilisation of a low-quality oscillator in the receiver):

$$\left|\frac{\Delta f}{f}\right| < 300 \frac{\text{m}}{\text{s}}.$$

and in geostationary orbit (utilisation of a high-quality oscillator in the receiver):

$$\left|\frac{\Delta f}{f}\right| < 10 \text{ m/s}.$$

4. It is possible to utilise an optional extra criterion, so as to be able to discriminate possible multiple solutions in the case of a receiver satellite in low orbit, which is the reference inclination of the satellite. In fact, this reference inclination is a quasiconstant parameter in the life of the satellite. The inclination closest to this reference inclination is then selected.

The method according to the invention enables an instantaneous geometric point of a receiver satellite to be calculated from signals received in orbit, when fewer than four transmitters are present simultaneously.

The main characteristics of the orbit of the receiver for which the method operates are the following:

low orbit (6400 Km<a<8400 Km) and slightly eccentric (e<0.01), with two satellites in visibility, low orbit (6400 Km<a<8400 Km), with three satellites in visibility, geostationary orbit with a satellite in visibility.

The method according to the invention is a complement to calculation of a classic point when four satellites or more are in visibility.

In an embodiment a device for calculating instantaneous characteristics of a receiver satellite in orbit allowing this method to be used comprises:

a circuit 30 for processing the radio-electric signal S, of a design close to the material, which is responsible for working out the measurements, a circuit 31 for calculating the characteristics of the satellite (geometric point) from several measurements, a circuit 34 (optional) allowing the characteristics of the satellite to be calculated from an orbital navigator 32, a circuit 33 for calculating the external aid contributed to the signal processing. This aid allows the speed of capture of other satellites to be accelerated. This aid can originate from calculation of the geometric point from the different measurements, or from the orbital navigator 32.

This device can be made in the form of a component additional to the orbital receiver, for example of type GNSS. This additional component then allows calculation of the GNSS point from two measurements at least. The means for processing the signal are then available as soon as two measurements are present.

APPLICATION EXAMPLES

The method according to the invention can be applied to all the GNSS receivers in orbit, from the moment when there is knowledge, albeit rough, of this orbit (actually knowing whether in low quasi-circular or geostationary orbit suffices), and this covers a wide range of satellites and orbits.

Different applications of the inventive process are possible to, for example:

a low-sensitivity receiver. In this case, it is difficult to capture four satellites simultaneously, specific orbits, such as the geostationary transfer orbit or the geostationary orbit, when the radio-electric transmission link is weak a satellite having a law of attitude or a non-optimal antenna placement for good reception of GNSS signals, improvement in the TTFF delay from the receivers, by supplying a point with fewer than four satellites in visibility, autonomous initialisation of orbital navigators (without ground help), more rapid supply of a means for acquiring signals (reduction of thresholds) for the receiver.

REFERENCES

[1] "Techniques and technologies des vehicules spatiaux. Localisation spatiale" (Techniques and technologies of space craft. Spatial localisation) by Michel Grondin, Jean-Luc Issler and Laurent Lestarguit (Editions Cepaduès, module VI, pages 191 to 264).

[2] "Orbital Navigation with a GPS Receiver on the HETE Spacecraft", de J. L. Issler, M. Tello (ION GPS, January 1994).

[3] Linear algebra, Geodesy and GPS "de G. Strang, K. Borre (Wellesley Cambridge, chapter 14, Global positioning system", pages 447 to 513).

[4] "Accord de standardisation; characteristics du system mondial de determination de la position NAVSTAR (GPS)" (Standardization Agreement: Characteristics of the NAVSTAR Global Positioning System (GPS)), (NATO, STANAG 429, 6 Nov. 1991).

[5] "GLONASS Approaches Full Operational Capability (FOC) de Peter Daly (ION GPS, pages 1021 to 1025, September 1995).

What is claimed is:

1. A method for calculating instantaneous characteristics of a satellite in orbit, equipped with a GNSS receiver, capable of performing measurements of pseudo-distance, when fewer than four transmitters are in simultaneous visibility, comprising:

pre-processing quantities measured by the receiver to deliver measurements of pseudo-distance, pseudo-speed, and instantaneous pseudo-accelerations, said pseudo-accelerations derived from pseudo-speeds measured close in time;

mathematically processing the measured quantities, enhanced by knowledge of complementary data concerning the orbit of the satellite and the receiver, delivering plural solutions;

physically filtering the plural solutions for delivering position and speed of the satellite and clock bias and drift of the receiver.

2. The method as claimed in claim 1, wherein, during the pre-processing, measurement of instantaneous pseudo-speed is calculated either by differentiation of two measurements of pseudo-distances close in time:

$$Pv = \frac{Pd2 - Pd1}{\Delta T},$$

ΔT being a time spread between two measurements Pd1 and Pd2, or by utilization of phase measurements, if available.

3. The method as claimed in claim 1, wherein, during the pre-processing, measurement of the instantaneous pseudo-acceleration is calculated by either differentiation of two instantaneous measurements of the pseudo-speeds close in time:

$$Pa = \frac{Pv2 - Pv1}{\Delta T},$$

ΔT being a time spread between the two measurements Pv1 and Pv2, or by utilization of phase measurements, if available.

4. The method as claimed in claim 1, wherein, during the mathematically processing, the plural solutions include:

position of the satellite $\vec{P}$, speed of the satellite $\vec{v}$;

clock bias of the receiver b;

clock frequency shift of the receiver $$\frac{\Delta f}{f}.$$

5. The method as claimed in claim 1, wherein, during the physically filtering, for a satellite in low orbit meniscal axis a of the plural solutions is considered limited: 6400 Km<a<8400 Km.

6. The method as claimed in claim 1, wherein, during the physically filtering, absolute value of the clock frequency shift of the receiver is considered limited: for a low-quality oscillator:

$$\left|\frac{\Delta f}{f}\right| < 300 \text{ m/s}$$

for a good-quality oscillator:

$$\left|\frac{\Delta f}{f}\right| < 10 \text{ m/s}.$$

7. The method as claimed in claim 1, wherein, during the physically processing, a reference inclination of the satellite is considered.

8. The method as claimed in claim 7, wherein the inclination of the satellite is the nearest to the reference inclination.

9. The method as claimed in claim 1, wherein, during the physically processing, the satellite is in radio-electric visibility of each transmitter.

10. The method as claimed in claim 1, wherein at least one transmitter is a satellite.

11. The method as claimed in claim 1, wherein at least one transmitter is a terrestrial station.

* * * * *